United States Patent [19]
Shepherd et al.

[11] Patent Number: 4,770,157
[45] Date of Patent: Sep. 13, 1988

[54] FOOD SMOKER DEVICE

[75] Inventors: Charles G. Shepherd; Thomas E. Squires, both of Oakville, Canada

[73] Assignee: B. D. Wait Co. Limited, Oakville, Canada

[21] Appl. No.: 104,912

[22] Filed: Oct. 6, 1987

[51] Int. Cl.$^4$ ................................................ F24B 3/00
[52] U.S. Cl. ..................................... 126/25 R; 99/482
[58] Field of Search .......................... 99/467, 481, 482; 126/9 R, 25 R, 25 A, 21 A, 41 R, 41 B, 41 D, 41 E, 43

[56] References Cited

U.S. PATENT DOCUMENTS 2,833,201  5/1958  Simank ................................... 99/482
3,611,911 10/1971  Martin ..................................... 99/482

FOREIGN PATENT DOCUMENTS 74589  2/1948  Denmark ............................... 99/482

Primary Examiner—Samuel Scott
Assistant Examiner—Noah Kamen
Attorney, Agent, or Firm—Rogers & Scott

[57] ABSTRACT

A barbeque having, for example, a heat source in the form of a gas burner, is provided with a device which permits smoke flavoring of food cooked on the barbeque. Wood chips are contained in a drawer which is received by a complementary sleeve located between the heat source and a cooking grill of the barbeque. During cooking the wood chips are heated by the heat source and the air flow through the drawer is restricted so that the wood chips give off smoke without igniting. The smoke flows about and flavors the food being cooked on the barbeque. Access to the sleeve and the wood chip drawer may be gained through a side wall of the barbeque body and thus the supply of wood chips may be replenished without interfering with the cooking operation. Means is provided to control the volume of smoke produced by the device.

10 Claims, 5 Drawing Sheets

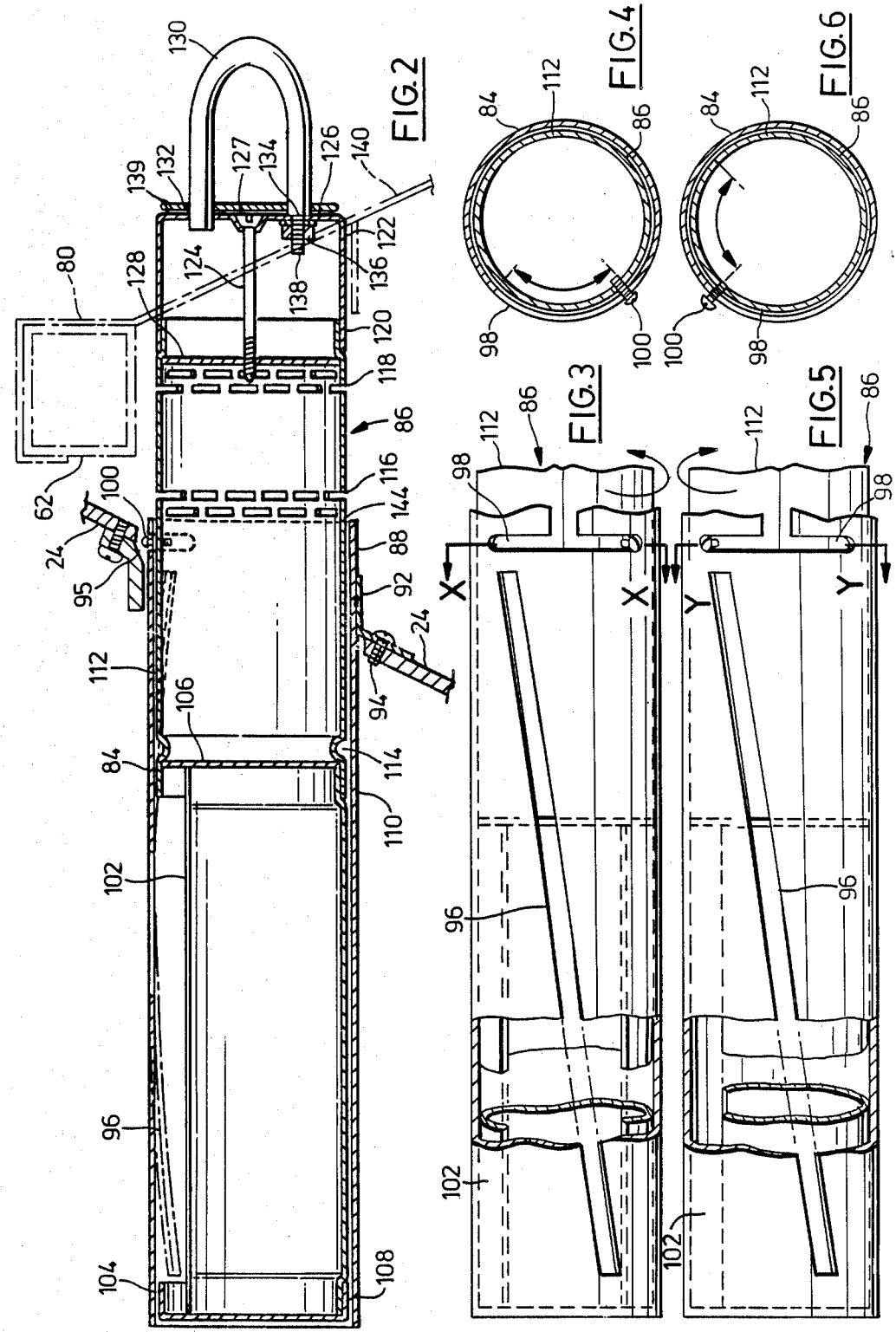

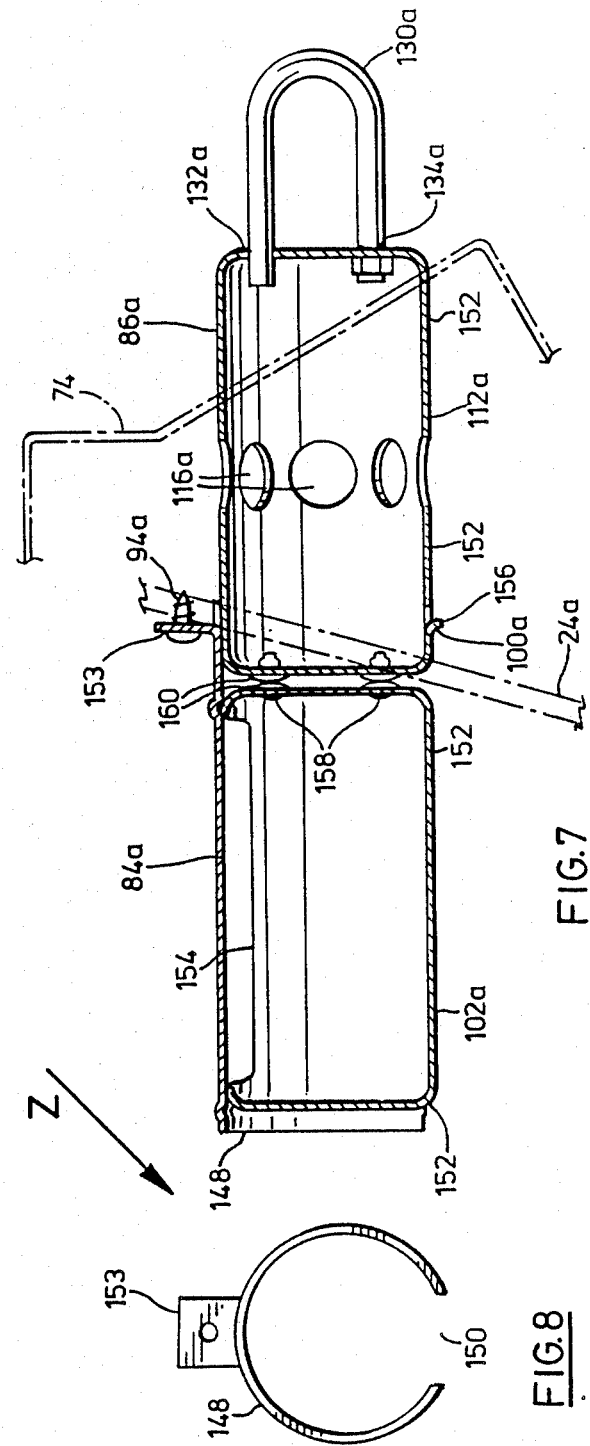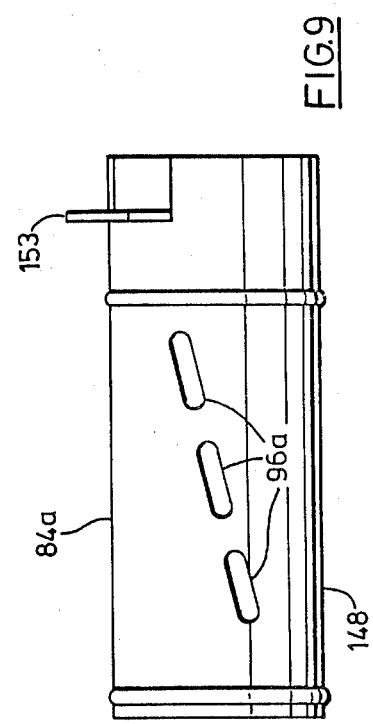

FOOD SMOKER DEVICE

BACKGROUND OF THE INVENTION

This invention relates to barbeques and in particular to a device for containing wood chips for use in smoke flavouring food as it is cooked on such barbeques. The device is located between the burner of the barbeque and a cooking grid which supports the food so that as the food is cooked the wood chips produce smoke which flows upwardly about the food. Air flow through the container can be restricted to limit the possibility of igniting and burning the wood chips and to control the flow of smoke.

Barbeques are a very popular means of cooking foods, particularly meats, and are often used outdoors as an alternative to a conventional stove. Generally a bargeque comprises a body formed of a base and a lid, a cooking grill supported in an upper portion of the base, and a heat source located in the base below the grill. The heat source may be in the form of burning charcoal or, as is becoming increasingly more common, a gas burner.

Charcoal fueled barbeques must be filled with the appropriate fuel before use and the fuel must then be ignited and burned under controlled conditions to ensure that the food is cooked and not burned. After use, ashes from the fuel must be cleared and the barbeque prepared for further use by adding more fuel. These barbeques give the food a characteristic "barbequed" taste which many users consider to be an essential feature of barbeque cooking. This taste stems at least in part from the burning of fat which drips from the food being cooked.

For greater convenience "clean" heat sources, especially gas burners, are being used inceasingly in barbeques. To achieve an even distribution of heat from a gas burner, a layer of natural lava cinders is contained on a grate between the burner and the cooking grill.

Though less popular than barbeque cooking, it is also common to smoke food at home, using an appliance which burns various typs of wood in chip form, the smoke rising to permeate food hung above the burning wood.

In an effort to give foods cooked on gas barbeques this sought after smoked flavour, it is known to place wood chips over the above-mentioned cinders on trays such that the chips are burned by the heat source to provide smoke to flavour the food. However, this negates many of the advantages gained by barbequeing with gas because the resulting ashes are inconvenient to remove and discard and also because the burning wood chips will tend to burn the food. In addition, it is both inconvenient and dangerous to replenish the supply of wood chips during cooking.

SUMMARY OF THE INVENTION

The present invention is intended to provide a device which allows the smoke flavouring of foods cooked on barbeques, particularly gas barbeques, while avoiding the above mentioned disadvantages by containing the wood chips in a separate unit which can be removed from the barbeque unit without interfering with the cooking operation.

Accordingly, in one of its aspects, the invention provides a device for containing wood chips or the like for location in the base of the body of a barbeque between the heat source and the grill of the barbeque. The device includes a wood chip drawer which is supported by a member within the base. Entry to the interior of the base is gained through an aperture in a wall of the base. An aperture is provided in the support member for communication between the interior of the base and an open upper portion of the drawer, movement of the drawer relative to the support member varying the length of the aperture in communication with the open portion of the drawer to vary the rate of combustion of the wood chips.

The wood chip carrying portion of the drawer may be slidably received by a sleeve which extends inwardly of a wall of the base between the heat source and a cooking grill. A handle may be provided on the proximal end portion of the drawer to facilitate placement and withdrawal of the drawer.

The invention will be better understood with reference to the drawings in which:

BRIEF DESCRIPTION OF THE DRAWINGS

FIG. 2 is a sectional side view of the device of FIG. 1;

FIG. 3 is a simplified broken plan view of the proximal portion of the device of FIG. 2 showing the wood chip drawer positioned in the sleeve for maximum air flow through the drawer;

FIG. 4 is a cross sectional end view on line X—X of FIG. 3;

FIG. 5 is a view similar to FIG. 3 and showing the wood chip drawer positioned in the sleeve for minimum air flow through the drawer;

FIG. 6 is a cross-sectional end view on line Y—Y of FIG. 5.

FIG. 7 is a sectional side view of a device in accordance with another embodiment of the present invention;

FIG. 8 is an end view of the sleeve of the device of FIG. 7;

FIG. 9 is a view on line Z of FIG. 8;

DESCRIPTION OF THE PREFERRED EMBODIMENTS

Figure 1:
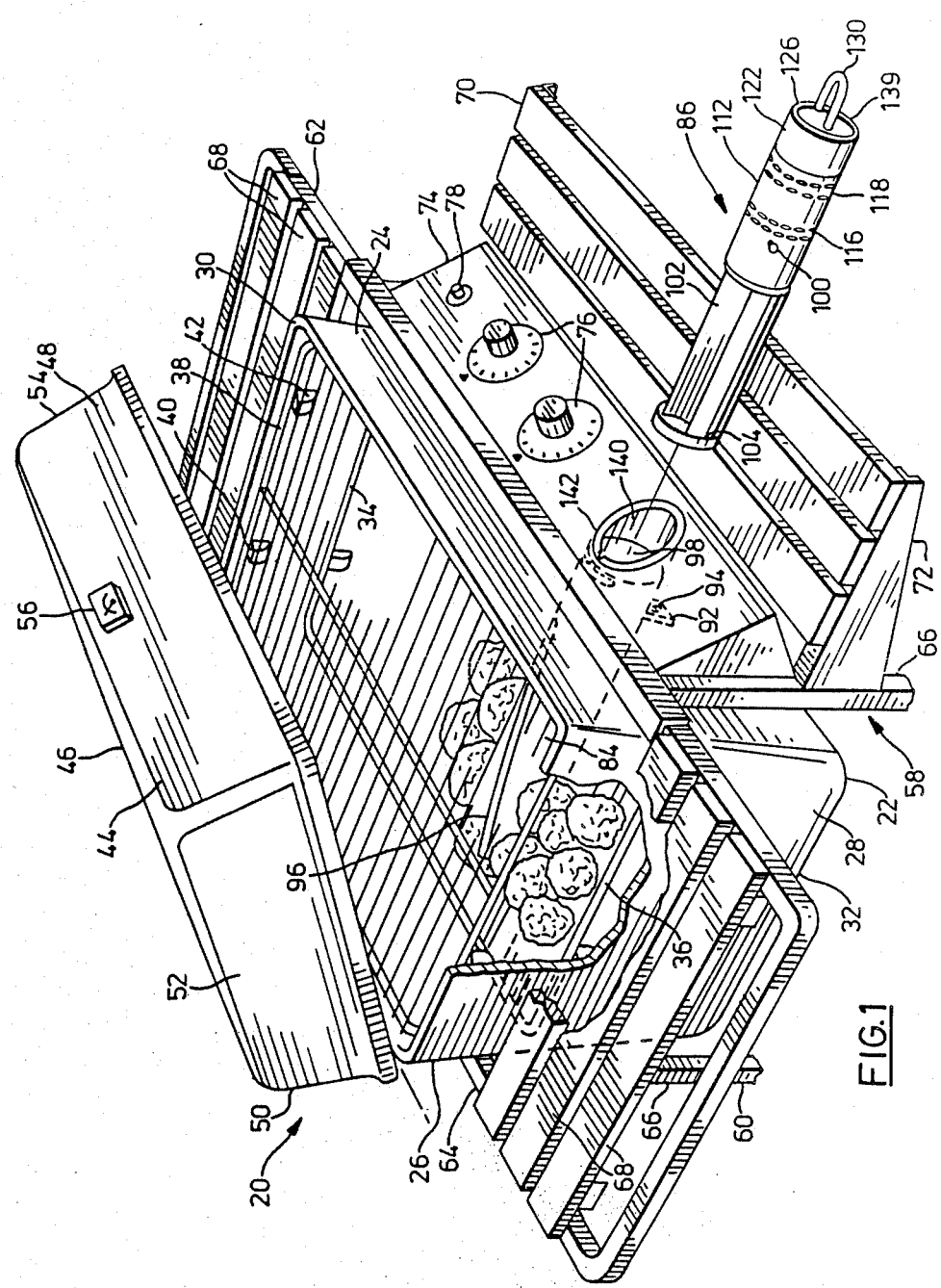
FIG. 1 is a partly cut-away and exploded perspective view of an exemplary barbeque incorporating a device in accordance with a preferred embodiment of the present invention.
Figure 11:
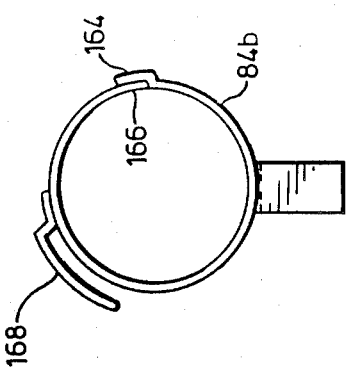
FIG. 11 is an end view of the assembled sleeve and having a drip cover.

Reference is made firstly to FIG. 1 of the drawings which illustrates a barbeque designated generally by the numeral 20. The barbeque includes a walled base 22 which is rectangular in plan and has a front 24, back 26, sides 28 and 30, and bottom 32. A gas burner is located on the bottom of the base 22 and a grate 34 in the base supports a plurality of lava blocks 36 above the gas burner and below a cooking grill 38. The grill 38 is supported over the open upper end of the base 22 on ledges 40 formed by small inward projections 42 on the side walls 28 and 30. Similar ledges support the grate 34.

A lid 44 is hingedly fitted to the upper edge of the back wall 26 of the base 22 and is shaped to meet and close over the base 22 to create an environment in which cooking can take place on the grill 38. The lid includes a top 46, front 48, back 50 and sides 52 and 54, and, as is conventional in better barbeques, a thermometer 56 is provided in the front 48 of the lid 44 to allow an operator to monitor the temperature inside the barbeque while cooking.

The base 22 is supported within a frame 58 formed of lengths of steel tubing 60. The frame 58 has horizontal front and rear members 62 nd 64 which are formed from the upper ends of upright members 66. Wood slat assemblies 68 extend along the sides of the base 22 to form work surfaces.

A third work surface is formed at the front of the barbeque unit 20 by three wood slats 70 which extend between a pair of bracket supports 72 (one of which is seen) fixed to the front upright members 66.

Reference is now made to FIGS. 1 and 2 of the drawings. Between the front wall 24 of the base and the front work surface is a sloping panel 74 which features two control dials 76 and an ignition switch 78 for the gas burner. The panel 74 is secured to the front frame members 62 by means of an integral channel 80 formed at the top of the panel 74 and hooked over the members 62.

An elliptical aperture 82 is provided in the sloping panel 74 to permit access to a horizontal cylindrical sleeve 84 which extends into the base 22 to receive a cylindrical wood chip drawer 86.

The sleeve 84 is open-ended and a short length of the proximal end portion 88 of the sleeve extends outwardly through an elliptical aperture 90 in the front 24. The sleeve 84 is fixed to the base 22 at the aperture 90 by means of an angled bracket 92 which is spot welded to the sleeve 84 and secured to the front 24 by a short screw 94. The sleeve 84 rests on the grate 34 among the lava blocks 36 so as not to form an undesirable thermal barrier to the heat rising from the burner to the grill 38. A drip guard 95 is screwed to the front 24 around the upper inside of the aperture 90 to lessen the likelihood of fat dripping from food on the grate 38 passing through the aperture 90.

Reference is next made to FIGS. 2-6 of the drawings. The upper portion of the sleeve features helical aperture 96, the purpose of which will be explained below. The aperture 96 may be cut from the sheet which forms the sleeve 84 as a diagonal aperture before the sheet is formed into a cylinder. An upper portion of the sleeve at the proximal end of the sleeve 84 features a T-shaped cut-out 98 to receive the body of a short screw 100 which extends from the wood chip drawer 86.

The drawer 86 includes an open topped part cylindrical wood chip basket 102. The basket 102 is closed at one end by an end cap 104 and at the other end by a disc shaped baffle 106 and both end portions 108 and 110 of the basket are of reduced diameter. The baffle 106 is located in the end portion of a cylindrical extension piece 112 between the end of the basket and an inwardly extending bead 114 of the extension piece formed in the wall of the extension piece 112. The end portion of the extension piece also receives the reduced end portion 110 of the basket 102.

When the drawer 86 is located in the sleeve 84 a portion of the extension piece, corresponding to the proximal end portion 88 described above, extends from the front 24. This portion includes two sets of staggered circumferential rectangular cut-outs 116 and 118 which act as thermal barriers to help limit conduction of heat from the distal to the proximal end of the drawer 86. If greater thermal insulation is required, the number of cut-outs may be increased accordingly.

The end portion 120 of the extension piece is of reduced diameter to receive an end cap 122 which is retained on the extension piece by means of a metal screw 124. The screw 124 extends from the end wall 126 of the cap, which is provided with a complementary recess 127 to receive the head of the screw 124, to a disc shaped heat reflecting baffle 128 which abuts a shoulder formed by the wall of the reduced portion of the extension piece 112. The baffles 128, 106 are provided with a heat reflective finish to offer additional thermal insulation to that provided by the cut-outs 116, 118.

An U-shaped handle 130 is centrally located in two apertures 132 and 134 in the end wall 126 and is held in place by means of a nut and washer 136 engaging a threaded portion 138 of reduced diameter and which extends from one of the ends of the handle 130. A disc of heat insulating material 139 is affixed to the end wall 126 to provide additional protection for an operator gripping the handle 130.

In use, wood chips are placed in the wood chip basket 102 of the drawer 86 which is then slid through the aperture 82 in the panel, guided by a curved support plate 140. This plate extends from the rear face of the panel 74, through the aperture 90 in the front 24 and into the sleeve 84. A slot 142 (FIG. 1) is provided in the panel 74 to permit passage of the screw 100 which extends from the drawer 86.

When the gas burner is ignited, the flames heat the sleeve 84 and hence the drawer 86 and the wood chips in the basket 102. These chips eventually reach a temperature at which they produce smoke. The volume of smoke passing upwardly from the chips in the basket 102 through the barbeque is controlled by rotating the drawer 86 in the sleeve 84 such that the length of the spiral aperture 96 which is in communication with the open top of the wood chip basket 102 is varied.

In the relative positions of drawer 86 and sleeve 84 shown in FIGS. 3 and 4 of the drawings, the screw 100 on the drawer 86 is at the end of one of the arms of the T-shaped cut-out 88 and the open top of the wood chip basket 102 is in communication with a substantial length of the aperture 96. Air is drawn into the wood chip basket 102 from the exterior through a small clearance gap 144 between the sleeve 84 and the drawer 86. The restricted air flow over the chips limits the possibility of igniting and burning the chips. If it is desired to reduce the air flow further, or to reduce the volume of smoke being produced, the drawer 86 is rotated in a clockwise direction to the position shown in FIGS. 5 and 6 of the drawings where the screw 100 abuts the end of the other arm of the cut-out 98. In this position the open top of the wood chip basket 102 faces an unbroken portion of the sleeve wall.

The drawer 86 may be removed easily from the sleeve 84 and the barbeque base 22 for emptying or restocking with wood chips without interfering with the cooking operation. As the wood chips are contained in the drawer 86, no ashes or wood chips come into contact with the barbeque base 22, the burner, the lava blocks 36, or the cooking grill 38.

The cut-outs 116 and 118 in the extension piece 112 help to limit the heat conducted from the heated portion of the drawer 86 to the handle 130.

The circular shape of the device allows heated gases from the burner to flow around the device and limits the likelihood of forming a cold spot on the grill 38 above the device.

The type of wood chips used to produce the smoke can be varied depending on the smoke flavouring the user desires. Woods used for chips include mesquite, hickory or apple and it is obvious that wood in other forms may also be used. For best smoke-producing results the wood chips are first submerged in water for several hours.

The base 22 and lid 44 described above are formed of aluminum alloy castings and the drawer 86 and sleeve 84 are of stainless steel sheet though other materials may be used if deemed suitable.

Another embodiment of a device is shown in FIGS. 7-9. Similar reference numerals are used to indicate components equivalent to those described with reference to FIGS. 1-6 with a suffix "a" added for clarity of description.

In this embodiment the sleeve 84a is formed of a cylinder 148 having a cut-out lower portion 150. An apertured tab 152 is pressed from the upper portion of the sleeve 84a which is secured to the barbeque front wall 24a by means of a screw 94a.

The sleeve 84a is sized such that it receives the wood chip drawer 86a with a light interference fit and is provided with a helical row of apertures 96a for communication with the wood chip basket 102a.

The wood chip basket 102a and the extension piece 112a are each formed of two similar cylindrical deep stampings 152. The stampings 152 which form the wood chip basket 102a are welded together to form a closed-ended cylinder and an aperture 154 is provided in the cylinder to permit access to the basket 102a.

The extension piece 112a is also formed of two stampings 152 welded together. Circumferential circular apertures 116a are formed in the cylinder to make a thermal barrier and a tab 156 is pressed out of the lower portion of the piece 112a to form a stop member 100a. Two apertures 132a, 134a are drilled in the proximal end of the piece 112a to receive the handle 130a.

The basket 102a and the piece 112a are joined by two rivets 158. The rivets 158 extend between indented apertures 160 provided in the adjacent end portions of the basket 102a and the piece 112a. The limited area of contact between the basket 102a and the piece 112a acts as an additional thermal barrier to heat travelling from the heated basket 102a to the handle 130a which it is desired to keep cool enough to be safely used by an operator.

Figure 10:
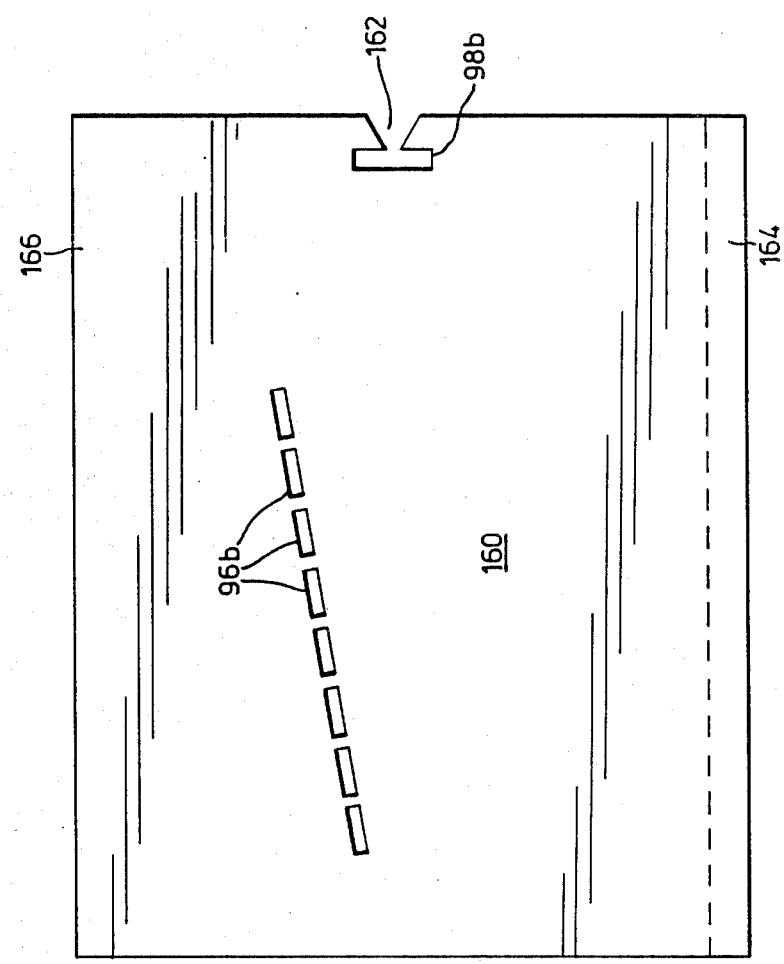
FIG. 10 is a plan view of a cut sheet for use in forming the sleeve of a device in accordance with a further embodiment of the present invention.
Figure 12:
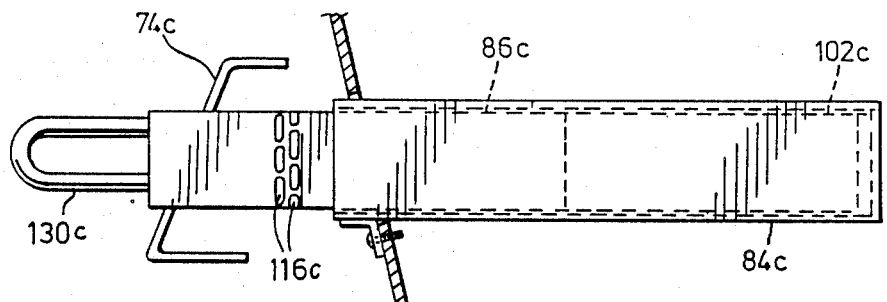
FIG. 12 is a side view of a device of a still further embodiment of the present invention.

Parts of a further embodiment of a device are shown in FIGS. 10-13. Similar reference numerals are used to indicate components equivalent to those described with reference to FIGS. 1-6 with a suffix "b" added for clarity of description FIG. 10 shows a rectangular sheet 160 of stainless steel which has been cut before being bent to form the sleeve 84b. A row of apertures 96b is cut from the sheet 160 and the T-shaped cut-out 98b is provided with a flared lead-in portion 162 to permit easier location of the drawer stop member.

Figure 13:
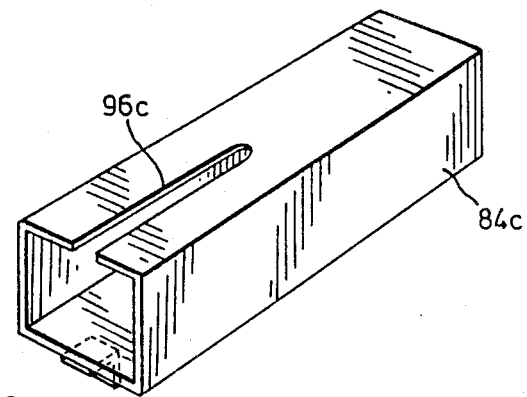
FIG. 13 is a perspective view of the sleeve of the device of FIG. 12.

An edge 164 of the sheet 160 is pressed out for overlapping the opposite edge 166 of the sheet 160 when the edges 164, 166 are welded together to form the sheet into a cylinder (FIG. 13).

An extended drip cover 168 is welded to the sleeve 84b to prevent fat from cooking food falling through the apertures 96b and possibly causing burning of the wood chips. The cover 168 is formed of a rectangular piece of stainless steel pressed into a stepped part cylindrical form as seen in FIG. 13.

Figure 14:
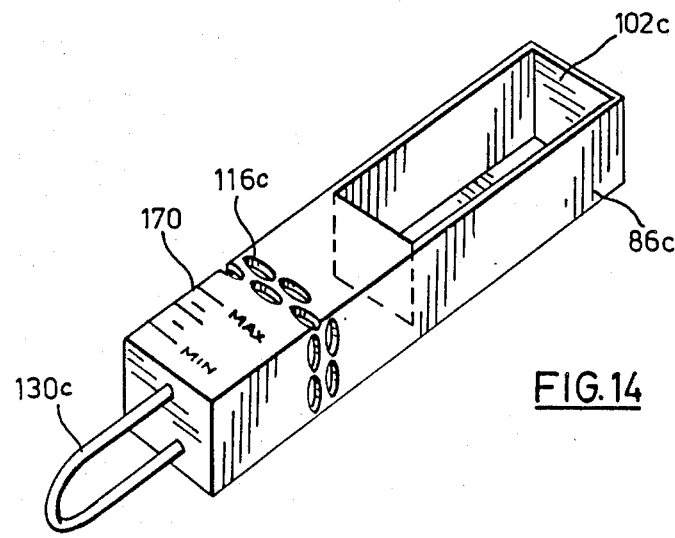
FIG. 14 is a perspective view of the drawer of the device of FIG. 12.

A still further embodiment of a device is shown in FIGS. 14-16. Similar reference numerals are used to indicate components equivalent to those described with reference to FIGS. 1-6 with a suffix "c" added for clarity of description.

In this embodiment the sleeve 84c and wood chip drawer 86c are of square cross-section. The aperture 96c extends along the centre of the upper proximal portion of the sleeve 84c. The volume of smoke the device produces is varied by pushing/pulling the drawer 86c into/out of the sleeve 84c, thus varying the length of the aperture 96c in communication with the wood chip basket 102c. A graduated linear scale 170 is provided on the upper face of the proximal end of the drawer 86c, the graduations being readable against the panel 74c.

Various other embodiments are within the scope of the invention. Also, although the exemplary barbeque is shown with one smoker device, it is within the scope of the invention to provide two devices in the barbeque for improved smoke output. These and other variations are within the scope of the invention as described and claimed.

We claim:

1. A barbeque comprising:
   a base having a front wall defining an opening;
   a lid shaped to meet and close over the base;
   a heat source located in the base;
   a grill for supporting food above the heat source;
   a drawer for containing combustible material and adapted to slide through the opening; and
   a support member for location in the base aligned with the opening for supporting the drawer between the heat source and the grill whereby during cooking the heat source acts on the material in the drawer to produce smoke which circulates within the base and lid and flavours food being cooked therein, the drawer and the support member defining means for controlling the air flow through the drawer and the support member to control the rate of combustion of the combustible material, said air flow control means comprising an aperture in the support member for communication between the interior of the base and an open upper portion of the drawer, movement of the drawer relative to the support member varying the length of the aperture in communication with the open portion of the drawer.

2. A barbeque as claimed in claim 1 in which the support member and the drawer are cylindrical such that the drawer may be slidably received by, and rotated within, the support member.

3. A barbeque as claimed in claim 2 in which the air flow control means comprises a helical lengthwise aperture in the support member for communication between the interior of the base and an open upper portion of the drawer, rotation of the drawer relative to the support member varying the length of the aperture in communication with the open portion of the drawer.

4. A barbeque as claimed in claim 3 in which stop means are provided to limit the rotation of the drawer in the support member, the stop means comprising a part circumferential slot in the support member for receiving a pin which extends radially from the drawer.

5. A barbeque as claimed in claim 1 and further comprising:
   a handle portion at a proximal end portion of the drawer, the proximal end portion extending from the base to be accessible to a user; and
   a thermal barrier in the form of at least one set of apertures in a wall of the drawer between a combustible material containing portion and the handle portion.

6. A device for use in the smoke flavouring of food in a barbeque comprising:
   a drawer for containing combustible material; and
   a support member for location in a base of a barbeque adjacent an aperture in a side wall of the base such that at least a combustible material containing end portion of the drawer may be passed through the aperture and supported by the support means between a heat source and a cooking grill, the heat source acting on the combustible material in the drawer to produce smoke which circulates within the barbeque and flavours food being cooked therein, the drawer and the support member defining means for controlling the air flow through the drawer and the support member to control the rate of combustion of the combustible material, said air flow control means comprising an aperture in the support member for communication between the interior of the base and an open upper portion of the drawer, movement of the drawer relative to the support member varying the length of the aperture in communication with the open portion of the drawer.

7. A device as claimed in claim 6 in which the support member and the drawer are cylindrical such that the drawer may be slidably received by, and rotated within, the support member.

8. A device as claimed in claim 7 in which the air flow control means comprises a helical lengthwise aperture in the support member for communication between the interior of the barbeque body and an open upper portion of the drawer, rotation of the drawer relative to the support member varying the length of the aperture in communication with the open portion of the drawer.

9. A device as claimed in claim 8 in which stop means are provided to limit the rotation of the drawer in the support member, the stop means comprising a part-circumferential slot in the support member for receiving a pin which extends radially from the drawer.

10. A device as claimed in claim 6 and further comprising:
   a handle portion at the distal end portion of the drawer, the end portion extending from the barbeque body to be accessible to a user; and
   a thermal barrier in the form of at least one set of apertures in a wall of the drawer between a combustible material containing portion and the handle portion.

* * * * *